(12) United States Patent
Aebker

(10) Patent No.: US 7,806,453 B2
(45) Date of Patent: Oct. 5, 2010

(54) STOWABLE COVER WITH STORAGE FEATURE FOR VEHICLE CARGO AREA AND METHOD

(75) Inventor: Paul T. Aebker, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 11/968,424

(22) Filed: Jan. 2, 2008

(65) Prior Publication Data

US 2009/0167043 A1 Jul. 2, 2009

(51) Int. Cl.
*B60R 11/06* (2006.01)
(52) U.S. Cl. .................... 296/37.16; 296/37.8
(58) Field of Classification Search ............. 296/37.1, 296/37.8, 37.16; 224/400, 484, 567
See application file for complete search history.

(56) References Cited

U.S. PATENT DOCUMENTS

| | | | |
|---|---|---|---|
| RE26,299 | E | 11/1967 | Burns |
| 4,073,534 | A | 2/1978 | Hira |
| 5,685,592 | A | 11/1997 | Heinz |
| 6,039,378 | A | 3/2000 | Bailey |
| 6,302,463 | B1 | 10/2001 | Moore et al. |
| 6,345,944 | B1 | 2/2002 | Florence |
| 6,406,083 | B2 | 6/2002 | Bharj et al. |
| 6,739,812 | B1 | 5/2004 | Pfeifer et al. |
| 6,773,046 | B2 | 8/2004 | Nakamitsu et al. |
| 6,821,600 | B1 | 11/2004 | Henson |
| 6,874,667 | B2 | 4/2005 | Dykstra et al. |
| 7,028,872 | B2 | 4/2006 | Lobanoff |
| 7,318,617 | B1 * | 1/2008 | Scotton ................ 296/37.16 |
| 2004/0262345 | A1 | 12/2004 | Polburn et al. |
| 2005/0161480 | A1 | 7/2005 | Tirey |

FOREIGN PATENT DOCUMENTS

| | | |
|---|---|---|
| JP | 11123988 | 5/1999 |
| JP | 2001018723 | 1/2001 |
| JP | 2005324632 | 11/2005 |
| JP | 2006062485 | 3/2006 |

* cited by examiner

*Primary Examiner*—Lori L Lyjak
(74) *Attorney, Agent, or Firm*—Kenealy Vaidya LLP; Mark E. Duell

(57) ABSTRACT

A cargo storage and support system and method is provided for use in a vehicle which includes a substantially planar storage body made of a collapsible material and having a first edge and a second edge substantially parallel to the first edge, at least one collapsible storage area formed within the substantially planar storage body and at least one attachment structure formed adjacent the first edge and the second edge of the storage body for attachment to a vehicle body. The storage body is maintained in tension when in use so that it can carry a load. The storage areas are formed within the storage body and can be accessed from a top surface of the storage body and are collapsible. The storage body can also be removed from the vehicle for pre-loading or if it is not being used. Attachment structures formed adjacent the storage body mate with receiving structures formed on a vehicle so that the storage body is maintained in tension.

23 Claims, 3 Drawing Sheets

STOWABLE COVER WITH STORAGE FEATURE FOR VEHICLE CARGO AREA AND METHOD

BACKGROUND

1. Field

The presently disclosed subject matter relates to a cargo storage and support system and method, and more particularly, to a cargo storage and support system that is stowable when not in use and capable of supporting high loads and provide efficient use of space when in use.

2. Brief Description of the Related Art

Most vehicles have areas for the storage of cargo. Automobiles typically have a trunk, rear seat area or hatch back area for the storage of cargo, while sport utility vehicles (SUVs) typically provide a rear cargo storage area. In general, these storage areas provide an empty space where cargo can be held for transport.

Cargo stored in the trunk, rear seat areas and rear cargo storage described above are often subject to disturbance caused by abrupt movements of the vehicle. For example, groceries placed in the rear cargo storage area of an SUV may dramatically shift during transport and, in some case, may become damaged.

In order to address the need for stable cargo storage in a vehicle, various solutions have been proposed. One such method has been to provide hooks in a vehicle's storage area. These hooks are situated on an inside wall of the vehicle cargo area, or relatively vertical surface of the vehicle cargo area, and at a location above the relatively horizontal surface upon which a cargo is intended to "rest." Typically, the hooks are permanently fixture in the vehicle and designed to allow a user to place the handles of a storage bag around it, thereby stabilizing the handles of the storage bag in hopes of stabilizing the storage bag and its contents.

There are several drawbacks to such hooks. First, it often is difficult to place cargo in a storage bag. Even if a storage bag can be used, it may be difficult to use the hooks described above because of difficulty placing the storage bag on a hook, as well as removing it from a hook. This occurs because the hooks are against a sidewall, which may serve as an obstacle, and because they are against a sidewall, one has to reach a certain distance into the vehicle to use the hook. Second, it often is difficult to grasp the handles of a bag from a hook because the handles often are "stretched" (or rather elongated) because the hook is not flexible. When the handles of a bag are stretched, or elongated, or twisted, the openings of the handles become difficult to discern, both with one's eyes and with one's hands. Third, a relatively limited number of bags can be placed on each hook. If the bags are roughly the same size, there is only a limited amount of "floor" space available for bags intended for a given hook because each bag's handles must be placed on the hook. Fourth, if there are a large number of bags, many hooks will be needed. In this regard, when more hooks are needed, the additional hooks become more difficult to reach. Fifth, it is possible for a bag to become separated from a hook, as there is nothing to maintain the handles of a bag in place on a hook. Consequently, loading bags on hooks and removing bags from hooks, as well as from the vehicle, is quite cumbersome and can be rather difficult.

Another method for addressing the problems inherent in transporting cargo is a net-type device, sometimes referred to as a "cargo net." Typically, such nets extend between two points in a vehicle. For example, in an SUV, a net may extend between the two sidewalls of the rear section, or cargo area, of the vehicle. Generally, the net itself may have two sidewalls, connected at the bottom, and an open top for receiving cargo, i.e., various items, including plastic grocery bags. Thus, such a net has a generally V-shaped or generally U-shaped cross-section. Also, the sidewalls of a net may be flexible to accommodate bags or items of various sizes.

There are several drawbacks, however, to cargo nets. First, as opposed to the hooks that typically are permanently-fixed features of an automobile, nets need to be set-up and taken-down. Otherwise, a net would use too much valuable cargo space when a net was not necessary, e.g., transporting pieces of furniture. Accordingly, using a net takes time, and the net typically needs to be stowed for extended periods of time. Second, the net is inherently cumbersome to use in that it is prone to tangling, unless it is always set-up in its ready-to-use mode. Third, a net has limited flexibility and, accordingly, has a somewhat limited capacity. Forth, a net may take up the entire cargo space and not allow room for cargo that is not shaped to fit inside the cargo net.

Yet another method for addressing the problems inherent in transporting cargo in a vehicle is to provide containment areas. Typically, these containment areas are areas smaller than the trunk of a sedan or the cargo area of an SUV and devoted to holding a small number, sometimes even a single container. Typically, a containment area is a prominently-visible compartment that is sometimes a compartment recessed into the floor surface or sidewall of a vehicle. In some vehicles, however, such as SUVs or station wagons, the floor surface of the rear section will lift up and reveal a containment area devoted to holding a cargo container. Such a hidden containment area may have one or more compartments designed for this purpose. In this way, the compartments provide a certain amount of sidewall to support individual cargo container. Further, a containment area may be equipped with flexible cords or other devices or features to help provide additional support.

There are several drawbacks, however, to containment areas. First, containment areas provide limited stability to the cargo they are designed to store and stabilize. Even if additional support features are provided, use of these features makes containment areas more difficult to use, i.e., by requiring several steps to stabilize an item. Second, there is a limited amount of space provided to stabilize items in a containment area, and usually more limited in a hidden containment area. This drawback is common to most areas specially designed to stabilize items. Third, containment areas usually have very little flexibility, e.g., to accommodate items of varying and/or odd size and/or shape. Fourth, containment areas are often difficult to use. For example, as just described, items may not quite fit easily in a containment area. Also, hidden containment areas may be more difficult to use than visible containment areas. For example, lifting up a section of the floor surface of the cargo area of an SUV requires that section of floor surface to be free of items or requires one to relocate whatever may be on top of that surface before accessing the hidden compartment area. Thus, in light of their many disadvantages, containment areas are underutilized.

Another device that provides containment areas for addressing the problems inherent in transporting cargo is that of an organizer. As with a net, an organizer would need to be set-up and taken-down so that the entire cargo area can be put to other uses. An organizer usually is a structure that is separate from the vehicle, but can be placed in a vehicle to provide a number of smaller containment areas to hold individual (or maybe a couple of) items. As with a hidden compartment (or even a prominently-visible and/or recessed compartment), such areas provide a degree of sidewall support that otherwise would not exist.

There are several drawbacks, however, to organizers for automobiles. First, such organizers require a relatively large amount of space when in use and when not in use. Most users do not welcome the idea of devoting a large amount of space in their automobile to such devices. Second, assembly, or set-up, of such organizers is not easy and requires time. These first two drawbacks alone render an organizer an impracticable device for addressing the concerns raised herein. Third, when placing a bag in or taking a bag out of a compartment that is located too far into the interior of an automobile, it is difficult for one to reach such compartments. Fourth, as stated above, any defined compartment provides limited flexibility for accommodating odd-sized items. Thus, as with a net and a hidden compartment area, in light of its many disadvantages, organizers are left underutilized.

Another device that is used for storing cargo in a vehicle's storage area is a hard cover, also called a tonneau. Conventional tonneaus generally include an internal support structure made up of a ribbing or steel tubing to support the tonneau cover. The tonneau itself is generally a planer structure made of plywood, injection molded plastic or blow molded plastic. Conventional tonneaus are typically installed behind the rear seats of a vehicle and sit over the cargo floor. Conventional tonneaus provide an additional flat plane upon which cargo can be stored, while still allowing the cargo floor to be accessible, but they may not be capable of handling heavy loads because of the limitations of their support structure. Furthermore, conventional tonneaus take up a significant amount of space in the vehicle's cargo area and cannot be easily removed from the cargo area.

In view of the drawbacks of the conventional devices described above, there is a need for a cargo system and method that can be stowed away when not in use, assists with the storage of heavy objects and/or objects in a variety of shapes, and does not take up the entire cargo storage area of a vehicle even when in use, etc.

SUMMARY

The disclosed subject matter addresses the above-described and other drawbacks in the conventional devices by providing a cargo support and storage system and method that provides a light weight, low cost solution that can be implemented in a variety of vehicles. According to an aspect of the disclosed subject matter, a cargo support and storage device can include a substantially planar storage body made of a collapsible material and having a first edge and a second edge substantially parallel to the first edge, at least one collapsible storage area formed within the substantially planar storage body and at least one attachment structure formed adjacent the first edge and the second edge of the storage body for attachment to a vehicle body.

According to another aspect of the disclosed subject matter, a cargo storage and support system for a vehicle having a cargo area having a first sidewall and a second sidewall is disclosed and can include, a storage body made of a collapsible material and having a first edge and a second edge substantially parallel to the first edge, the storage body having a substantially planar top surface when the storage body is in a totally non-collapsed state, at least one collapsible storage container located in the storage body and extendible beyond a plane of the substantially planar top surface of the storage body when the storage body is in a totally non-collapsed state, and at least one attachment structure formed adjacent each of the first edge and the second edge of the storage body for attachment to the first sidewall and second sidewall of the vehicle, respectively.

According to another aspect of the disclosed subject matter, a cargo storage and support system for a vehicle having a cargo area having a first sidewall and a second sidewall, and a floor, can include, a storage body made of a woven collapsible and substantially opaque material, the storage body having a first edge and a second edge substantially parallel to the first edge, a first attachment structure located adjacent the first edge of the storage body, a second attachment structure located adjacent the second edge of the storage body, a first receiving structure located in the first sidewall of the vehicle, a second receiving structure located in the second sidewall of the vehicle, and at least one collapsible storage container located in the storage body and extendible in a direction towards the floor of the vehicle and beyond a plane containing both the first attachment structure and the second attachment structure when the first attachment structure is connected to the first receiving structure and the second attachment structure is connected to the second receiving structure.

According to one aspect of the invention, the storage body has storage areas formed within its structure which can accommodate cargo and which are collapsible when not in use.

According to another aspect of the disclosed subject matter, the entire storage body is collapsible and can be removed from a vehicle when not in use.

According to another aspect of the invention, attachment structures formed adjacent the storage body mate with receiving structures formed on the vehicle body so that the storage body is maintained in tension so that it can carry loads.

According to another aspect of the disclosed subject matter, a method for supporting and storing cargo in a vehicle having a cargo area having a first sidewall and a second sidewall can include, providing a substantially planar storage body made of a collapsible material and having a first edge and a second edge substantially parallel to the first edge, a first attachment structure located adjacent the first edge of the storage body and a second attachment structure located adjacent the second edge of the storage body, and at least one collapsible storage container formed within the substantially planar storage body, attaching the first attachment structure to the first sidewall of the vehicle, and extending the storage body from a collapsed state into a state in which a top surface of the storage body is substantially planar by attaching the second attachment structure to the second sidewall of the vehicle.

According to another aspect of the disclosed subject matter, the method can include expanding the at least one collapsible storage container such that it extends from a bottom surface of the storage body.

According to another aspect of the disclosed subject matter, the method can include opening a container cover located in a floor surface of the vehicle such that the container cover rotates into an open area defined by the expanded collapsible storage container.

According to another aspect of the disclosed subject matter, the method can include connecting the container cover to the collapsible storage container such that the container cover is held open Still other aspects, features, and attendant advantages of the disclosed subject matter will become apparent to those skilled in the art from a reading of the following detailed description of embodiments constructed in accordance therewith, taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
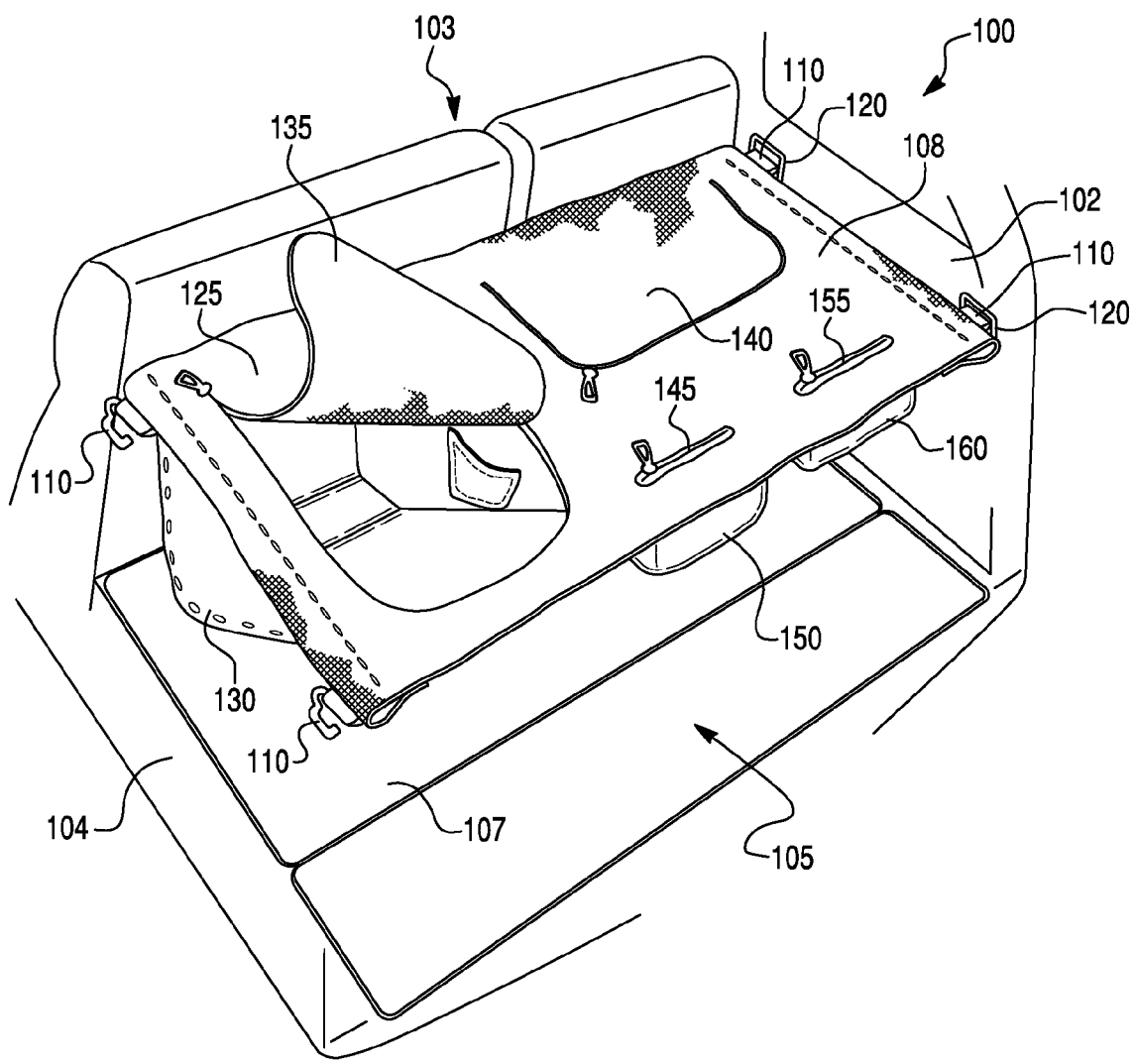
FIG. 1 illustrates a perspective view of an exemplary embodiment of a cargo storage and support system made in accordance with the principles of the disclosed subject matter.

The invention provides a system for storing and supporting cargo in a vehicle. The system according to the disclosed embodiments occupies little space when in use, can be stowed away when not in use and can accommodate a large amount of cargo of varied shapes and sizes.

Although the following description illustrates the system according to the disclosed embodiments in the cargo area of an SUV, it should be understood that the system can be used in any automobile and in other areas of an automobile, such as the rear seat area or trunk, or in other vehicles, such as airplanes and trains.

Referring to the drawing figures, like reference numerals designate identical or corresponding elements throughout the several figures.

FIG. 1 illustrates a perspective view of an exemplary embodiment of a cargo storage system 100 in accordance with the principles of the disclosed subject matter. FIG. 1 shows a cargo area 105 of a vehicle which is bound by rear seats 103, a first sidewall 102, a second sidewall 104 and a generally horizontal planar floor 107. It should be understood the cargo area 105 may be any area in a vehicle capable of holding cargo, including but not limited to a vehicle trunk, hatchback area or the cargo region of a sport utility vehicle (SUV).

FIG. 1, taken from the perspective of one looking into the rear of an SUV also shows that the cargo support system 100 includes a substantially planar storage body 108 which is disposed adjacent to the first sidewall 102 and the second sidewall 104. The storage body 108 is also disposed above the planar floor 107 so that the surface of the planer floor 107 can be viewed and accessed. The storage body 108 includes a plurality of expandable storage bags that are sized so that they protrude below the planar surface of the storage body 108. FIG. 1 shows a storage bag 125 which can be accessed using a flap 135. The flap 135 can be accessed through the use of zippers, buttons or any other known fastening mechanisms. Once the flap 135 is opened, a user can access the storage area 130 of the storage bag 125 so that goods can be placed into the storage area 130. FIG. 1 also shows another storage bag 140, a storage bag 145 which has a storage area 150 and a storage bag 155 which includes a storage area 160. A storage area is also provided for the storage bag 140 but is not visible in FIG. 1. The storage bags 125, 140, 145 and 155 are integrated into the storage body 108 and can be expanded or collapsed depending on whether they are in use or not.

FIG. 1 also shows that the cargo storage system 100 is also equipped with four attachments structures 110. In FIG. 1, these four attachment structures 110 are formed along the edges of the storage body 108 so that they are adjacent to either the first sidewall 102 or the second sidewall 104. The four attachments structures 110 in FIG. 1 are also located near the corners of the storage body 108. The attachment structures 110 allow the cargo storage system 100 to be mounted to the body of a vehicle so that it is firmly held in tension. FIG. 1 shows receiving structures 120 which are formed adjacent the first sidewall 102. The receiving structures 120 are capable of receiving and connecting with the attachment structures 110. Attachment structures are also formed (though not shown) adjacent the second sidewall 104 and are capable of connecting to adjacent attachment structures 110. In this manner, the attachment structures 110 connect with corresponding receiving structures 120 so that the storage body 108 is firmly held in tension and has a planar surface that is capable of holding cargo. The attachment structures 110 and receiving structures 120 also allow the cargo storage system 100 to be easily removed and stowed so that the entire cargo area 105 is open and can be used if desired.

The attachment structures 110 in FIG. 1 appear as hooks, but it should be understood that they can be any mechanism that allows for easy attachment to the vehicle body, including clips, buttons, snaps, etc. The receiving structures 120 are shown as tie downs capable of mating with the attachment structures 110 but may be any structure capable of receiving and connecting to the attachment structures 110.

Thus, the cargo storage system 100 can provide a planar surface that serves to cover a vehicle's cargo area and provides a surface that can be used for cargo storage. The cargo storage system 100 also provides expandable storage bags that are expanded when cargo is placed within them. Furthermore, the entire cargo storage system 100 can be removed and pre-packed prior to installation in a vehicle. The cargo storage system 100 is also collapsible and can be removed, collapsed and stowed away if it is not needed.

Figure 2:
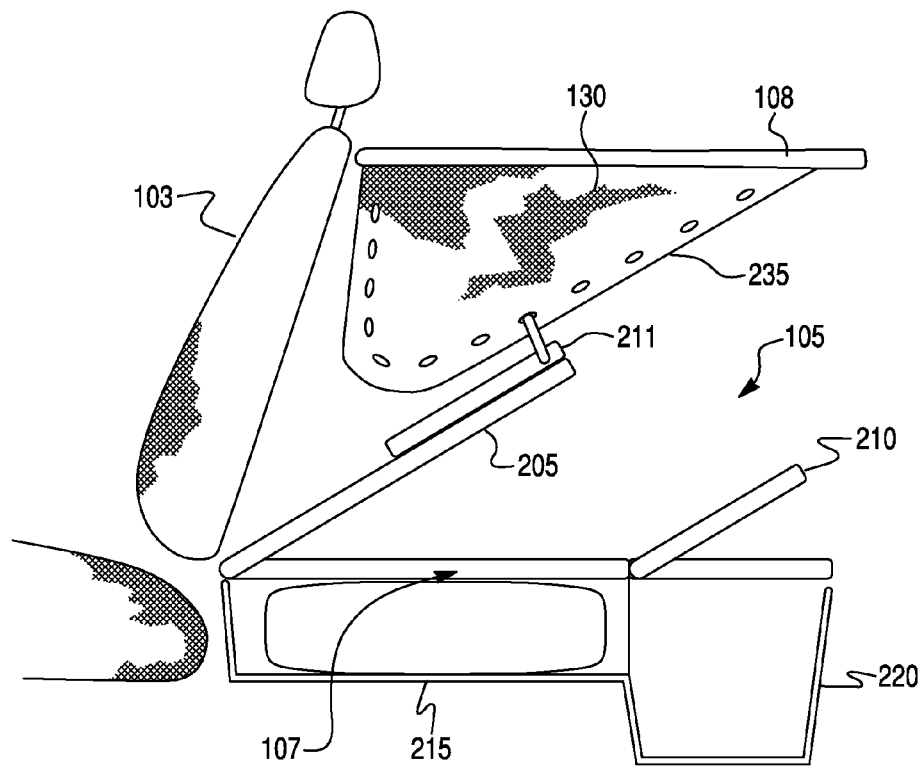
FIG. 2 shows a side view of the cargo storage and support system of FIG. 1.

FIG. 2 shows a side view of the cargo storage system 100 of FIG. 1. In FIG. 2, the cargo area 105 of a vehicle is bound by the seat 103 and the generally horizontal planar floor 107. The cargo area 105 has been fitted with the cargo storage system 100. The storage body 108 is disposed behind the seat 103 and above and substantially parallel to the planar floor 107. Thus, there is a gap between the storage body 108 and the planar floor 107. The storage body 108 is retained in place by the attachment structures 110 of FIG. 1 (not shown in FIG. 2). A plurality of storage bags are formed within the storage body 108 which can be accessed through the top of the storage body 108. FIG. 2 also shows the expandable storage area 130 which corresponds to the storage bag 125 of FIG. 1. As can be seen in FIG. 2, the storage area 130 can expand into the cargo area 105 of the vehicle as may be necessary. Although the cargo storage system 100 allows users to hold significant store of cargo, as can be seen in FIG. 2, even when the storage areas are expanded, they do not occupy the entire cargo area 105, but leave additional space for cargo to be placed on the planar floor 107.

The storage body 108 can be made from a material that is substantially opaque. In other words, although the storage body 108 can include portions that are made from netting or transparent plastic, the majority of the storage body is constructed of a woven fabric or other material that does not allow an ordinary observer to see through the material. The opaque woven material allows the body 108 to be tensioned between the various attachment structures 110 when held in place to the receiving structures 120 in a vehicle such that the top surface of the body 108 can be substantially planar (if desired) and can sustain a substantial load placed thereon. In addition, the opaque material provides the benefits of concealing the contents of the lower cargo area in the vehicle and provides substantial diversity in terms of design and aesthetics.

FIG. 2 also shows that the cargo area 105 includes two sectional receptacles. A first receptacle formed as first bin 215 may be used to store a spare tire and other tools, while the second receptacle (bin 220) provides additional storage area. The first bin 215 includes a first cover 205 that can be lifted when access to the first bin 215 is desired. The second bin 220 also includes a second cover 210 which can be lifted when access to the second bin 220 is desired. In the embodiment of FIG. 2, a connector 211, such as a hook, may be provided to connect the first cover 205 to a lower section of the storage area 130. This provides additional stability to the storage area 130 and shifts the storage area 130 if necessary when the first cover 205 is opened. Thus, the first cover 205 can be fully opened even when the storage area 130 is full with cargo. FIG. 2 also shows that the second cover 210 can be raised to access the second bin 220.

As described earlier, the cargo storage system 100, including the storage body 108 and all of the storage bags and storage areas may be constructed of a soft, flexible material so that the cargo storage system 100 is collapsible when it is not in use and expandable when cargo storage is desired. As can be seen in the side view of FIG. 2, the storage bag 125 and storage area 130 may have a substantially triangular cross-sectional shape (as viewed in a direction normal to the sidewalls of the vehicle). In addition, a bottom surface 235 of the storage bag 125 can be made from or include a relatively hard material as compared to the remaining portion of the storage bag 125 such that an empty storage area 130 is easily collapsed upward when an object is stowed underneath the storage bag 125 (and forced into the bottom surface 235 of the bag 125 to push the bag 125 into a collapsed state if no objects are present in the bag 125). For example, hard plastic inserts can reinforce the bottom of the storage bag 125. This concept is applicable to all of the storage bags of the support system 100.

The triangular cross-section of the bag 125 (and other bags of the system 100) can provide an area into which a cover 205 of a receptacle 215 can rotate about a hinge 206. The hinge 206 can be formed as a living hinge that incorporates a smaller cross-section or fabric material that allows the cover 205 to rotate with respect to the floor 107. Alternatively, the hinge can include a traditional cam and pin type structure, a ball point rotational hinge, or other types of structures that allow a pivot or rotational movement between two structures.

Figure 3:
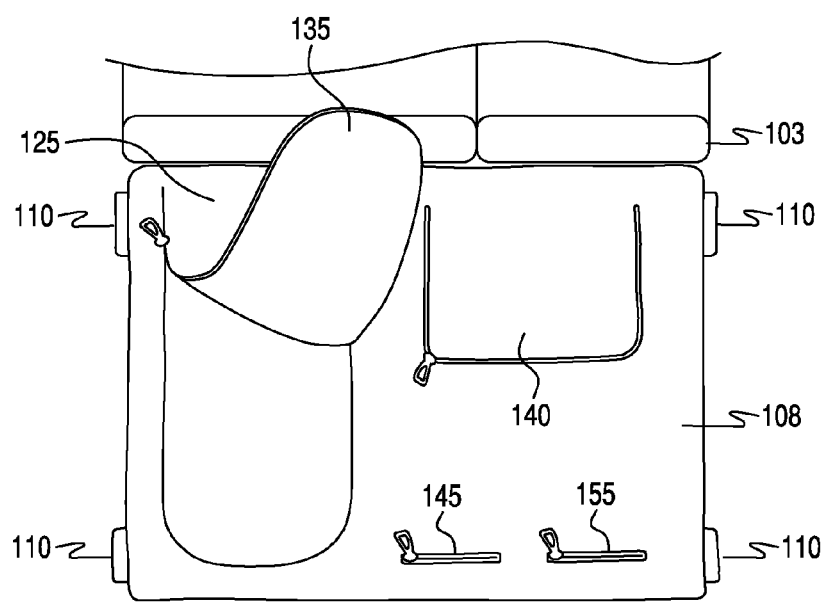
FIG. 3 is top view of the cargo storage and support system of FIG. 1.

FIG. 3 shows a top view of the cargo storage system 100 of FIGS. 1 and 2. FIG. 3 shows the cargo storage system 100 when it is installed and available for use. The cargo storage system 100 is disposed behind the seats 103 and over the planar floor 107 shown in FIGS. 1 and 2. FIG. 3 also shows the storage body 108 with various storage bags built into its body, including storage bag 125 with the flap 135 raised so that the storage area is accessible. FIG. 3 also shows additional storage bags 140, 145 and 155. The attachment structures 110 can be disposed near the corners of the storage body 108 for connecting to the vehicle.

Figure 4:
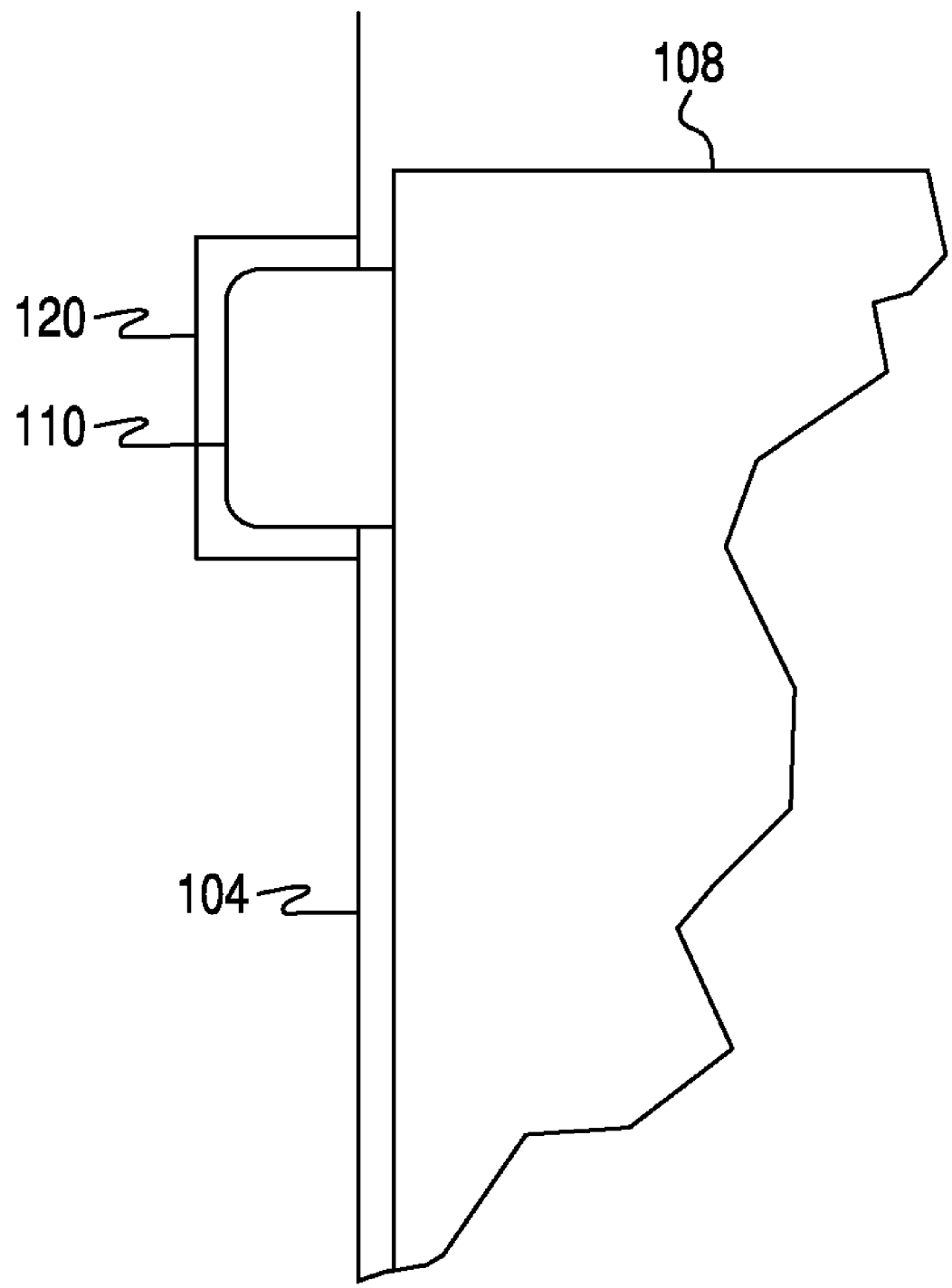
FIG. 4 is a detailed view of an attachment structure according to an embodiment of the disclosed subject matter.

FIG. 4 shows a detail view of the connection point between the attachment structure 110 and the receiving structure 120. FIG. 4 shows the storage body 108 adjacent the second sidewall 104. The attachment structure 110 is disposed near a corner of the storage body 108 and engages the receiving structure 120. In this manner, the storage body 108 is maintained in place so that it can be used to store cargo. As described above, it should be understood that the attachment structure 110 and receiving structure 120 could be a hook and a tie down, respectively, or any other structures capable of mating so that the storage body 108 is maintained in place, including, clips, buttons, snaps and/or hook and loop type structures.

It should be noted that several of the disclosed structures that make up the cargo storage system 100 can be varied in terms of shape, size, material, connections, etc., without departing from the spirit and scope of the presently disclosed subject matter. For example, the storage body 105 can be made of any soft and flexible material, including various fabrics, meshes and/or plastic-based materials. Furthermore, any number of storage bags may be built into the storage body 108, and they can take on any number of shapes and orientations. Access to the storage bags can be accomplished through zippers, snaps, buttons or other such systems.

The cover 205 is shown as including a connector 211 for connection to the storage bag 125. The connector 211 can be in the form of a hook that mates with a receiving structure in the storage bag, and can also include other connection structures, such as buttons, hook and loop structures, snaps, etc. The connector 211 provides the ability for the cover 205 to be maintained in an open position, and also allows the cover 205 to cause the storage bag 125 to extend into a fully non-collapsed (i.e., open) position.

While the invention has been described in detail with reference to exemplary embodiments thereof, it will be apparent to one skilled in the art that various changes can be made, and equivalents employed, without departing from the scope of the invention. The foregoing description of embodiments of the invention has been presented for purposes of illustration and description. It is not intended to be exhaustive or to limit the invention to the precise form disclosed, and modifications and variations are possible in light of the above teachings or may be acquired from practice of the disclosed subject matter. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A cargo storage and support system for a vehicle having a cargo area, the cargo area having a first sidewall and a second sidewall, the cargo storage and support system comprising:

a storage body made of a collapsible material and having a first edge and a second edge substantially parallel to the first edge, the storage body having a substantially planar top surface when the storage body is in a totally non-collapsed state;

at least one collapsible storage container located in the storage body and extendible beyond a plane of the substantially planar top surface of the storage body when the storage body is in the totally non-collapsed state and wherein the at least one collapsible storage container is accessible through an opening formed in the top surface of the storage body; and at least one attachment structure formed adjacent each of the first edge and the second edge of the storage body for attachment to the first sidewall and second sidewall of the vehicle, respectively.

2. The cargo storage and support system according to claim 1, wherein the opening includes at least one of a zipper, a button, a snap, and hook and loop structure.

3. The cargo storage and support system according to claim 1, further comprising:
at least one receiving structure formed adjacent each of the first sidewall and the second sidewall of the vehicle, the at least one receiving structure configured to receive the at least one attachment structure of the first edge and second edge of the storage body, respectively.

4. The cargo storage and support system according to claim 1, wherein the storage body is maintained in tension when the attachment structure formed adjacent each of the first edge and the second edge of the storage body are attached to the first and second sidewalls of the vehicle, respectively.

5. The cargo storage support system according to claim 1, wherein the entire storage body is formed of collapsible material and configured to reduce in size when detached from the vehicle.

6. The cargo storage and support system according to claim 1, wherein two first attachment structures are formed spaced away from each other along the first edge and two second attachment structures are formed spaced away from each other along the second edge.

7. The cargo storage and support system according to claim 6, wherein the first sidewall of the vehicle includes two first receiving structures, and the two first attachment structures mate with the two first receiving structures located in the first sidewall of the vehicle.

8. The cargo storage and support system according to claim 1, wherein the at least one attachment structure includes at least one of a hook, a buckle, a snap, a button, and a hook and loop structure.

9. The cargo storage and support system according to claim 1, wherein the storage container has a substantially triangular cross-sectional shape when viewed along an axis extending substantially normal to both the first and second sidewalls of the vehicle.

10. The cargo storage and support system according to claim 9, wherein the vehicle includes a floor located between the first and second sidewalls, the floor including a receptacle, the receptacle having a cover connected to the receptacle by a hinge, and the storage container includes a bottom surface that, in combination with the floor of the vehicle, defines an open area into which the receptacle cover can rotate into about the hinge.

11. The cargo storage and support system according to claim 10, wherein the storage container includes a connection structure configured to connect to and hold the receptacle cover when the receptacle cover is rotated into an opened position with respect to the receptacle.

12. A cargo storage and support system for a vehicle having a cargo area, the cargo area having a first sidewall and a second sidewall, the vehicle including a floor, and the cargo storage and support system comprising:
a storage body made of a woven collapsible and substantially opaque material, the storage body having a first edge and a second edge substantially parallel to the first edge;
a first attachment structure located adjacent the first edge of the storage body;
a second attachment structure located adjacent the second edge of the storage body;
a first receiving structure located in the first sidewall of the vehicle and configured to be attached to the first attachment structure;
a second receiving structure located in the second sidewall of the vehicle and configured to be attached to the second attachment structure; and
at least one collapsible storage container located in the storage body and extendible in a direction towards the floor of the vehicle and beyond a plane containing both the first attachment structure and the second attachment structure when the first attachment structure is connected to the first receiving structure and the second attachment structure is connected to the second receiving structure.

13. The cargo storage and support system according to claim 12, wherein the at least one collapsible storage container is accessible through an opening formed in a top surface of the storage body.

14. The cargo storage and support system according to claim 13, wherein the opening includes at least one of a zipper, a button, a snap, and hook and loop structure.

15. The cargo storage support system according to claim 12, wherein the entire storage body is formed of collapsible material and configured to reduce in size when detached from the vehicle.

16. The cargo storage and support system according to claim 12, wherein the first attachment structure includes a hook, and the first receiving structure includes a tie down.

17. The cargo storage and support system according to claim 12, wherein the storage container has a substantially triangular cross-sectional shape when viewed along an axis extending substantially normal to both the first and second sidewalls of the vehicle.

18. The cargo storage and support system according to claim 17, wherein the floor includes a receptacle, the receptacle having a cover connected to the receptacle by a hinge, and the storage container includes a bottom surface that, in combination with the floor of the vehicle, defines an open area into which the receptacle cover can rotate into about the hinge.

19. The cargo storage and support system according to claim 18, wherein the storage container includes a connection structure configured to connect to and hold the receptacle cover when the receptacle cover is rotated into an opened position with respect to the receptacle.

20. A method for supporting and storing cargo in a vehicle having a cargo area, the cargo area having a first sidewall and a second sidewall, the method comprising:
providing a storage body made of a collapsible material and having a first edge and a second edge substantially parallel to the first edge, a first attachment structure located adjacent the first edge of the storage body and a second attachment structure located adjacent the second edge of the storage body, and at least one collapsible storage container formed within the storage body;
attaching the first attachment structure to the first sidewall of the vehicle;
extending the storage body from a collapsed state into a state in which a top surface of the storage body is substantially planar by attaching the second attachment structure to the second sidewall of the vehicle; and
expanding the at least one collapsible storage container such that it extends from a bottom surface of the storage body.

21. The method for supporting and storing cargo in a vehicle of claim 20, further comprising:
opening a container cover located in a floor surface of the vehicle such that the container cover rotates into an open area defined by the expanded collapsible storage container.

22. The method for supporting and storing cargo in a vehicle of claim 21, further comprising:

connecting the container cover to the collapsible storage container such that the container cover is held open.

23. The method for supporting and storing cargo in a vehicle of claim 20, wherein attaching includes attaching the first attachment structure to the first sidewall of the vehicle via hooks at two locations, and further includes attaching the second attachment structure to the second sidewall of the vehicle via hooks at two locations, such that the storage body is held in tension in a substantially planar state.

* * * * *